(12) United States Patent
Hunter

(10) Patent No.: US 6,865,608 B2
(45) Date of Patent: *Mar. 8, 2005

(54) METHOD AND SYSTEM FOR SIMPLIFIED ACCESS TO INTERNET CONTENT ON A WIRELESS DEVICE

(75) Inventor: Kevin D. Hunter, Fort Myers, FL (US)

(73) Assignee: NeoMedia Technologies, Inc., Fort Myers, FL (US)

( * ) Notice: Subject to any disclaimer, the term of this patent is extended or adjusted under 35 U.S.C. 154(b) by 783 days.

This patent is subject to a terminal disclaimer.

(21) Appl. No.: 09/821,677

(22) Filed: Mar. 29, 2001

(65) Prior Publication Data

US 2001/0047428 A1 Nov. 29, 2001

Related U.S. Application Data

(60) Provisional application No. 60/193,737, filed on Mar. 31, 2000, provisional application No. 60/193,755, filed on Mar. 31, 2000, and provisional application No. 60/193,836, filed on Mar. 31, 2000.

(51) Int. Cl.[7] ............................................. G06F 15/16
(52) U.S. Cl. .................. 709/229; 709/203; 709/217; 709/219; 709/225; 709/226; 707/9; 707/10
(58) Field of Search ................................ 709/245, 219, 709/203, 238, 229, 217; 707/9, 10; 715/501.1, 507

(56) References Cited

U.S. PATENT DOCUMENTS

| | | | | |
|---|---|---|---|---|
| 5,640,193 A | * | 6/1997 | Wellner | 725/100 |
| 5,804,803 A | * | 9/1998 | Cragun et al. | 235/375 |
| 5,812,776 A | * | 9/1998 | Gifford | 709/217 |
| 5,905,248 A | * | 5/1999 | Russell et al. | 235/462.15 |
| 5,913,210 A | * | 6/1999 | Call | 707/4 |
| 5,933,829 A | * | 8/1999 | Durst et al. | 707/10 |
| 5,938,727 A | * | 8/1999 | Ikeda | 709/218 |
| 5,978,773 A | * | 11/1999 | Hudetz et al. | 705/23 |
| 5,986,651 A | * | 11/1999 | Reber et al. | 345/738 |
| 6,012,102 A | * | 1/2000 | Shachar | 710/5 |
| 6,027,024 A | * | 2/2000 | Knowles | 235/472.01 |
| 6,064,979 A | * | 5/2000 | Perkowski | 705/26 |
| 6,076,733 A | * | 6/2000 | Wilz et al. | 235/462.01 |
| 6,101,486 A | * | 8/2000 | Roberts et al. | 705/27 |
| 6,108,656 A | * | 8/2000 | Durst et al. | 707/10 |
| 6,542,933 B1 | * | 4/2003 | Durst et al. | 709/229 |

OTHER PUBLICATIONS

Microsoft Corporation (2002). Microsoft Computer Dictionary (5th Edition). Redmond, Washingtion: Microsoft Press, pp. 428,562.*

* cited by examiner

Primary Examiner—Hosain Alam
Assistant Examiner—Asad M. Nawaz
(74) Attorney, Agent, or Firm—Anthony R. Barkune, P.C.

(57) ABSTRACT

A method of and system for accessing a primary content file with a client device that is browser-based; i.e. that does not require a plug-in type program to be executed on the client device in addition to the browser. URLs based on linkage codes entered into the client device are assembled by a network-based URL-assembly server rather than at the client device. This invention is especially suited for use with web-enabled cell phones or an internet kiosks.

44 Claims, 7 Drawing Sheets

METHOD AND SYSTEM FOR SIMPLIFIED ACCESS TO INTERNET CONTENT ON A WIRELESS DEVICE

CROSS REFERENCE TO RELATED U.S. APPLICATIONS

This application claims priority from: (1) Hunter, "METHOD AND SYSTEM FOR SIMPLIFIED ACCESS TO INTERNET CONTENT ON A WIRELESS DEVICE", U.S. Provisional Application No. 60/193,737, filed Mar. 31, 2000, the contents of which are incorporated herein by reference; (2) Hunter, et al., "SYSTEM FOR USING WIRELESS WEB DEVICES TO STORE WEB LINK CODES ON A LIST SERVER FOR SUBSEQUENT RETRIEVAL", U.S. Provisional Application No. 60/193,755, filed Mar. 31, 2000, the contents of which are incorporated herein by reference; and (3) Hunter, "DEVICE-BASED ROUTING FOR WEB CONTENT RETRIEVAL", U.S. Provisional Application No. 60/193,836, filed Mar. 31, 2000, the contents of which are incorporated herein by reference.

FIELD OF THE INVENTION

This invention relates to a method and system for simplified access of Internet content such as web pages through a wireless device such as a cellular telephone by entry of a linkage code that is associated with such Internet content.

BACKGROUND OF THE INVENTION

Recently, a new generation of cell phones has been introduced that include provisions for Internet connectivity and "micro-browsers." Using this class of device, the cell phone user can directly access content on the World Wide Web, receive email, be notified of changes in "subscribed information" such as sports scores or stock prices, etc.

The constraints imposed on a "micro-browser" in a cell phone environment pose a unique problem for both the information provider as well as the user retrieving the information. The development of the Wireless Application Protocol ("WAP") specification was specifically designed to address a number of fundamental differences between classic Internet and Web-based services and services on a wireless data network. These issues included the differences in needs and expectations as well as differences imposed by the device. That is, wireless devices will generally have less powerful CPU's, less memory and smaller displays than conventional computers. Wireless devices may have very different input devices. Wireless devices other than cell phones may be used that have very different capabilities. All of these issues have been addressed in the WAP specification and architecture. In particular, the WAP system is in no way restricted to cell phones—integration into other devices with wireless connectivity (e.g. the PALM PILOT personal digital assistant) was clearly anticipated. Thus, although this application will generally refer specifically to cell phones, anything described in that context would also apply to any other comparable wireless device, such as a Personal Digital Assistant ("PDA").

FIG. 1 outlines the basic WAP architecture. Wireless devices are not directly "on the Internet" in the same sense as traditional computers. The fact that devices roam around, as well as the sheer number of devices expected to be deployed, discourage a solution in which each wireless device has its own IP address and communicates directly. In addition, the standard Internet protocols require a fair amount of overhead, which poses a problem on a channel with limited bandwidth. As a result, a new set of wireless protocols was developed. These include the Wireless Session Protocol ("WSP") and the Wireless Datagram Protocol ("WDP") which parallel the function of the TCP/IP and UDP Internet protocols. Wireless Telephone Application ("WTA") Servers "speak" these protocols natively, and can be directly accessed by wireless devices.

While for certain applications the requirement of a new class of server is acceptable, restricting wireless devices to this class of server would not adequately leverage the huge embedded base of Internet equipment. As such, the architecture includes WAP proxies, which serve as a bridge between the wireless network and the standard Internet. When a digital device attempts to access a resource via a standard URL, this request is passed to the WAP Proxy using wireless protocols. The WAP Proxy reformats this request into a standard HTTP 1.1 query, retrieves the content from the standard Web Server, and then passes the result back to the wireless device using the wireless protocol. Using this system, wireless devices can access any server on the Internet.

A web site that natively "understood" wireless devices would generally return content in the new Wireless Markup Language (WML), or possibly in the older Handheld Device Markup Language (HDML). Recognizing that achieving deployment of a second, parallel coding standard for documents might slow the penetration of the WAP technology, the WAP Architecture also includes provisions for filters that could translate standard HTML into WML automatically. These filters can be integrated into the WAP Proxy itself, or can exist between the web server and the WAP Proxy. This would, at least in theory, allow a wireless user to access any existing content on the web, even if the web site was not specifically designed for access by devices of this class.

A system and method for utilizing a link code or linkage code to cause a client computer to automatically access a web resource is disclosed in copending U.S. patent application Ser. No. 09/543,178, filed on Apr. 5, 2000 and incorporated by reference herein. In the system described therein, the link code is a bar code that is scanned by a bar code scanner and input into a client software program that uses the decoded link code to request a URL template from an external server computer. The server takes the link code, returns the URL template, and the link client program assembles the URL using other data at the client. The URL is passed to a web browser, which then retrieves the web resource. This process may also be performed by manually entering a text string associated with the code, such as by entering a UPC number found at the bottom of a typical UPC barcode. This is a powerful way of utilizing a general purpose computer to automatically access a web resource without having to type in a lengthy URL.

It is noted that the system described above relies on the use of a client program running on the client computing device for obtaining, assembling, and then providing the URL to the web browser program. In general purpose personal computers, loading and running of such a client program is of course a typical and easily-done process. It would be desirable, however, to use this content retrieval technology with a client device such as a web-enabled cell phone, in which the use of add-on programs such as the linkage client is not easily accomplished. That is, with the proliferation of web-enabled cell phones and the like, it would be desirable to enable such devices to use such content retrieval methodologies without requiring adaptation of the software or firmware already present on such devices. One aspect of the invention described herein is thus a server-based URL assembly/retrieval methodology that requires no modification to existing web-enabled devices such as web-enabled cell phones or internet kiosks.

Another problem encountered by utilization of web-enabled cell phones for Internet access is that such devices have unique display capabilities. That is, one cannot simply take any standard HTML web page and display it on a microbrowser or other such device. Thus, it is desired to be able to use the same linkage code in order to provide different types of content to different types of display devices. That is, it is desired to be able to format the content retrieved differently as a function of the device on which it will be displayed. As a result, a user entering a link code with a web-enabled cell phone will be automatically provided with WML or HDML content appropriate for display on that cell phone, while another user entering the same linkage code into a desktop computer will be provided with standard HTML content suitable for display on a large screen.

Although web-enabled cell phones can access web pages using the appropriate linkage code technology, one further problem is that much of the original content won't be displayable in the cell phone, since it will be in the form of big HTML pages. Alternatively, a user may be preoccupied and may simple wish to store a linkage code for subsequent retrieval. Therefore, it would be desirable to use the cell phone as a linkage code access device, without retrieving the associated content, but just for acquiring the linkage codes and uploading them to a code list server for later access by the user at a PC running the appropriate software.

SUMMARY OF THE INVENTION

The present invention is a method of and system for accessing a primary content file with a client device that is browser-based; i.e. that does not require a plug-in type program to be executed on the client device in addition to the browser. The user inputs into the client device a linkage code comprising a routing identification code and an item identification code, and the client device transmits to a URL-assembly server a data stream comprising the linkage code. The URL-assembly server extracts the routing identification code from the data stream and then obtains a URL template associated with the routing identification code, the URL template comprising the name of a resolution server and at least one parameter field to be completed by the URL-assembly server. The URL-assembly server completes the URL template by filling in at least the item identification code and then sends the completed URL template to the resolution server named therein as a primary content URL request. The resolution server determines the location of the primary content file based on the item identification code and then provides the client device with the primary content file.

The URL-assembly server first obtains the URL template from a routing server. The URL-assembly server may then cache the URL template along with an expiration date for the URL template, which may be obtained from the routing server.

The data stream transmitted from the client device to the URL-assembly server may also further include a URL template selection code. In this event, then the URL-assembly server also extracts the URL template selection code from the data stream, and the URL template obtained by the URL-assembly server is also associated with the URL template selection code.

The URL template may be further completed by filling in least one parameter field with a device identification code, which may be included in the data stream transmitted from the client device to the URL-assembly server. The URL template may also be further completed by filling in least one parameter field with user data, which for example may be retrieved from a user database (populated by a user during a first registration process) located on a registration server.

The resolution server may directly return the primary content file, or it may redirect the client device to the primary content file by transmitting to the browser on the client device a primary URL for the primary content file. Alternatively, the primary URL may be sent to the client device via a proxy server, wherein the primary URL comprises an auto-request code that automatically redirects the client device to a content server containing the primary content file.

The linkage code input into the client device may for example be a bar code symbol that is scanned with a bar code scanning device coupled to the client device. The linkage code may also be a human-readable alphanumeric text string that may be typed in with a keypad connected to the client device.

The client device may be a wireless device such as a web-enabled cell phone, in which case a proxy server may used by the device for communication with the URL-assembly server, the resolution server and the content server.

Thus, in the method and system of the invention, an existing browser-based client device such as a web-enabled cell phone or an internet kiosk, may be used to obtain content files from servers on the internet wherein the URL assembly steps are carried out on a server platform on the internet, instead of being done by a plug-in type module running with the client's browser.

DETAILED DESCRIPTION OF THE INVENTION

Figure 1:
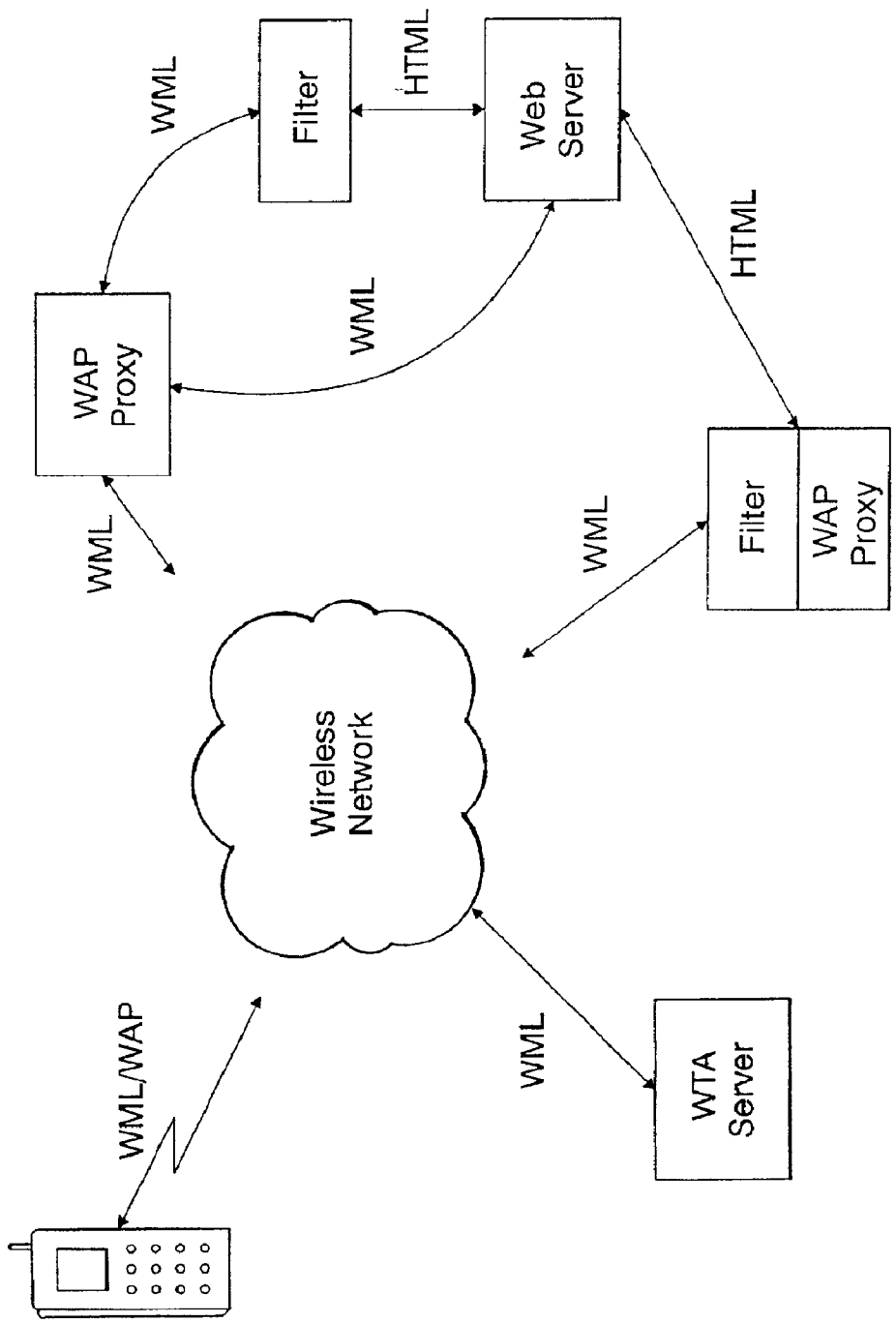
FIG. 1 depicts a schematic overview of the wireless application protocol architecture.

The system of the present invention is a modification of the invention described in "SYSTEM AND METHOD OF USING MACHINE-READABLE OR HUMAN-READABLE LINKAGE CODES FOR ACCESSING NETWORKED DATA RESOURCES", copending U.S. patent application Ser. No. 09/543,178, filed Apr. 5, 2000 by Hunter et al., previously incorporated herein by reference ("the copending application"). In the system described therein, a linkage code is a bar code that is scanned by a bar code scanner and input into a client software program that uses the decoded linkage code to request a URL template from an external server computer. The inputting of the code may also be performed by manually entering a text string associated with the code, such as by entering a UPC number found at the bottom of a typical UPC barcode. The linkage codes of the invention are not limited to UPC codes, however, and the invention supports European EAN codes, ISBN codes for books, as well as custom linkage code formats.

In a preferred embodiment of that invention, the linkage code includes two subcodes: a routing identification code ("RID") and an item identification code ("IID"). In the embodiment wherein the linkage code is a UPC code, the RID can be the manufacturer's portion of the UPC, whereas the IID can be the item code portion of the UPC. The client passes the RID to a routing server to obtain a URL link to a resolution server for that code, and the client completes the URL link by filing in the IID. The client then passes the completed URL link to the resolution server to obtain a target URL of content associated with the IID on the content server associated with the RID.

The two step resolution process allows for multiple resolution servers, thus providing scalability, with each server having its own database of target URLs. Since the address of a resolution server for a particular RID changes infrequently with respect to number of times a user seeks to access the content server associated with the RID, the RID obtained from the routing server can be cached on the client for rapid lookup. The RID thus obtained can be associated with an expiration date so that the RID is periodically refreshed.

The system of the invention also includes a user database maintained by a registration server. The first time a user utilizes the invention to, for example, scan a UPC barcode to access a web site associated with the product, the user is directed to a registration procedure wherein the user is prompted to enter demographic data about him or herself. This data can include the user's name, address, age, gender, preferred language, and preferred interests. The registration server returns a user identification code ("UID") to the client, which caches it. The UID is passed to the routing server, which can then access the user data base and fill user data into the template URL. The template URL is returned to the client, which fills in the UID and IID to complete the lookup-URL. The client then passes the lookup-URL to the resolution server, which uses the user data along with a rules database to return a target-URL that addresses content specifically for that user. This feature of the invention is referred to as profiled routing.

Thus, the use of linkage codes is a powerful way of utilizing a general purpose computer to automatically access a web resource without having to type in a lengthy URL. Linkage codes are particularly useful in the context of wireless, hand-held web enabled devices such as cell phones, PDAs, or pocket personal computers ("pocket PCs"). Cell phones, for example, do not support the full alphabetic keyboard of a personal computer, and thus entering a full URL for a web site is quite tedious. Most phones use a metaphor in which numeric buttons are pressed multiple times to scroll through several letters and/or punctuation marks, with either a button press or a pause indicating acceptance of the current letter. For example, www.amazon.com is entered on a cell phone numeric keypad as 99900262999966666002226666. On the other hand, the associated linkage code is merely 92801726. The all digit linkage code is shorter and easier to enter than the full URL, and much more intuitive to use. The advantage of linkage codes is even more apparent for those handheld devices that include barcode scanners, such as PDA's.

Although some wireless, hand-held web enabled devices, such as PDAs such as the PALM PILOT PDA, could easily be provided with the client plug-in required to map the linkage code into a URL, cell phones are not so easily adapted. There is also a large number of cell phones already in use. The inventors have thus found that it is preferable to locate this functionality on another server, referred to herein as a URL-assembly server. This enables any wireless device user to utilize linkage codes to access web content by merely accessing the appropriate page of the URL-assembly server that provides the mapping, without the necessity of installing the plug-in on the wireless client device.

Figure 2:
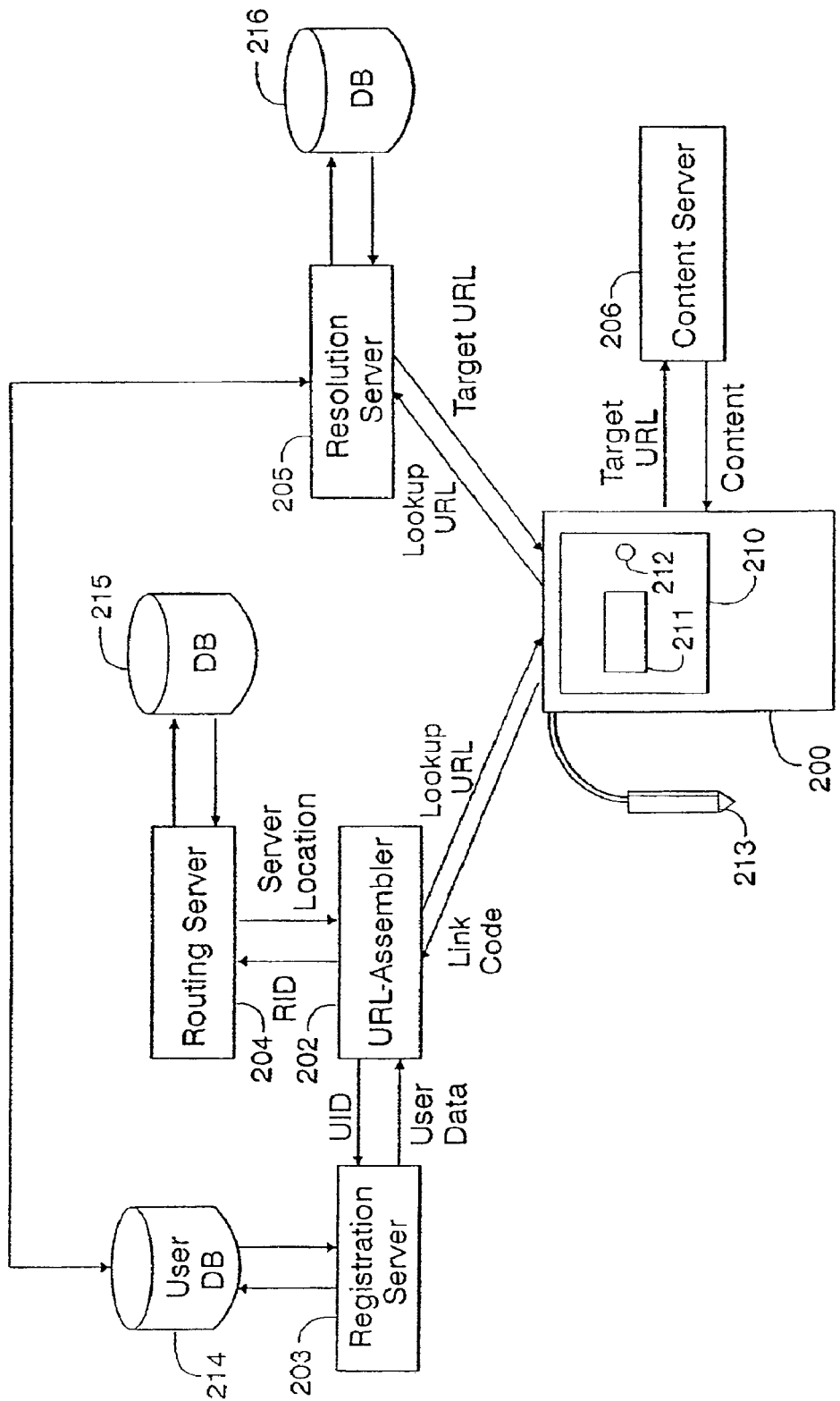
FIG. 2 depicts a block diagram of an exemplary system of the present invention for a device directly connected to the Internet.

Referring now to FIG. 2, an exemplary system configuration for a web-enabled device, such as a PDA that supports an HTML display, is depicted. Device 200 can execute a web browser whose interface is displayed in display area 210. When executing, the web browser can display the linkage code entry window, referred to as a go-window. The go-window includes a field 211 for entering a linkage code, and a button 212. A user can key in or write in a linkage code in field 211 and activate button 212 to find the associated web page. Alternatively, if device 200 supports a scanner 213, a barcode can be scanned in.

Figure 2A:
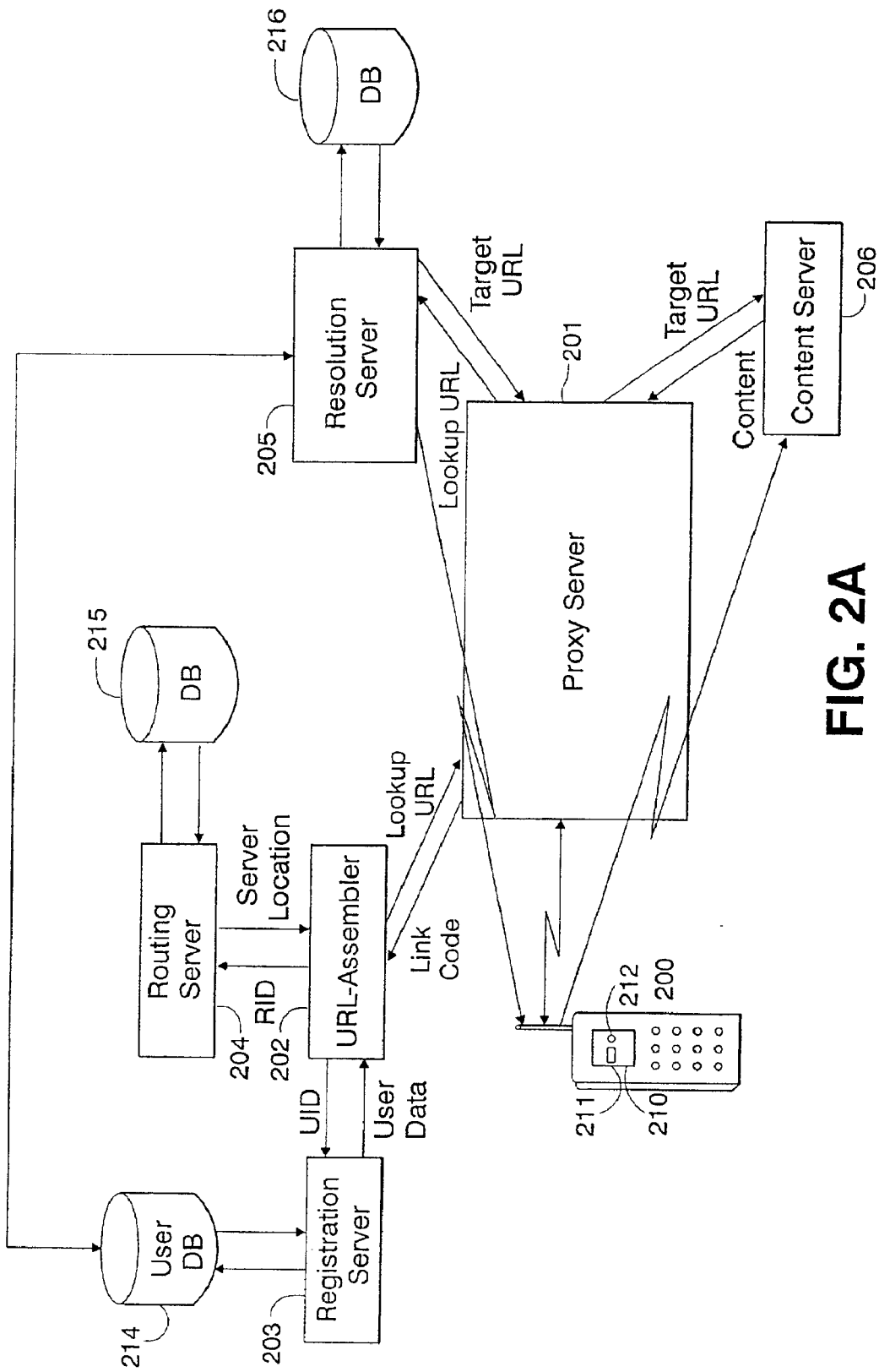
FIG. 2A depicts a block diagram of an alternative system of the present invention for a device connected to the Internet via the wireless application protocol.

If device 200 is an Internet enabled device, such as a PALM VII PDA, it can transmit the linkage code just entered over the Internet to a URL-assembly server 202. The device 200 can also optionally transmit a user identification ("UID") to the URL-assembly server 202. If the device 200 is a WAP enabled cell phone that displays WML content, the transmission to the URL-assembly server 202 is typically mediated by a proxy server 201, shown in FIG 2A, that converts the WAP transmission into an HTTP compliant transmission. The URL assembly server 202 in turn communicates over the Internet with a registration server 203, which maintains a database of user information 214, and a routing server 204, which maintains a resolution server database 215. The URL-assembly server utilizes the RID portion of the linkage code, along with the UID, if available, to assemble a lookup URL in a manner described below. The lookup URL addresses a resolution server 205 that contains (in database 216) the target URL of the Internet content associated with the linkage code. The target URL received from the resolution server 205 redirects device 200 to the content server 206 containing the content associated with the linkage code.

Figure 3A:
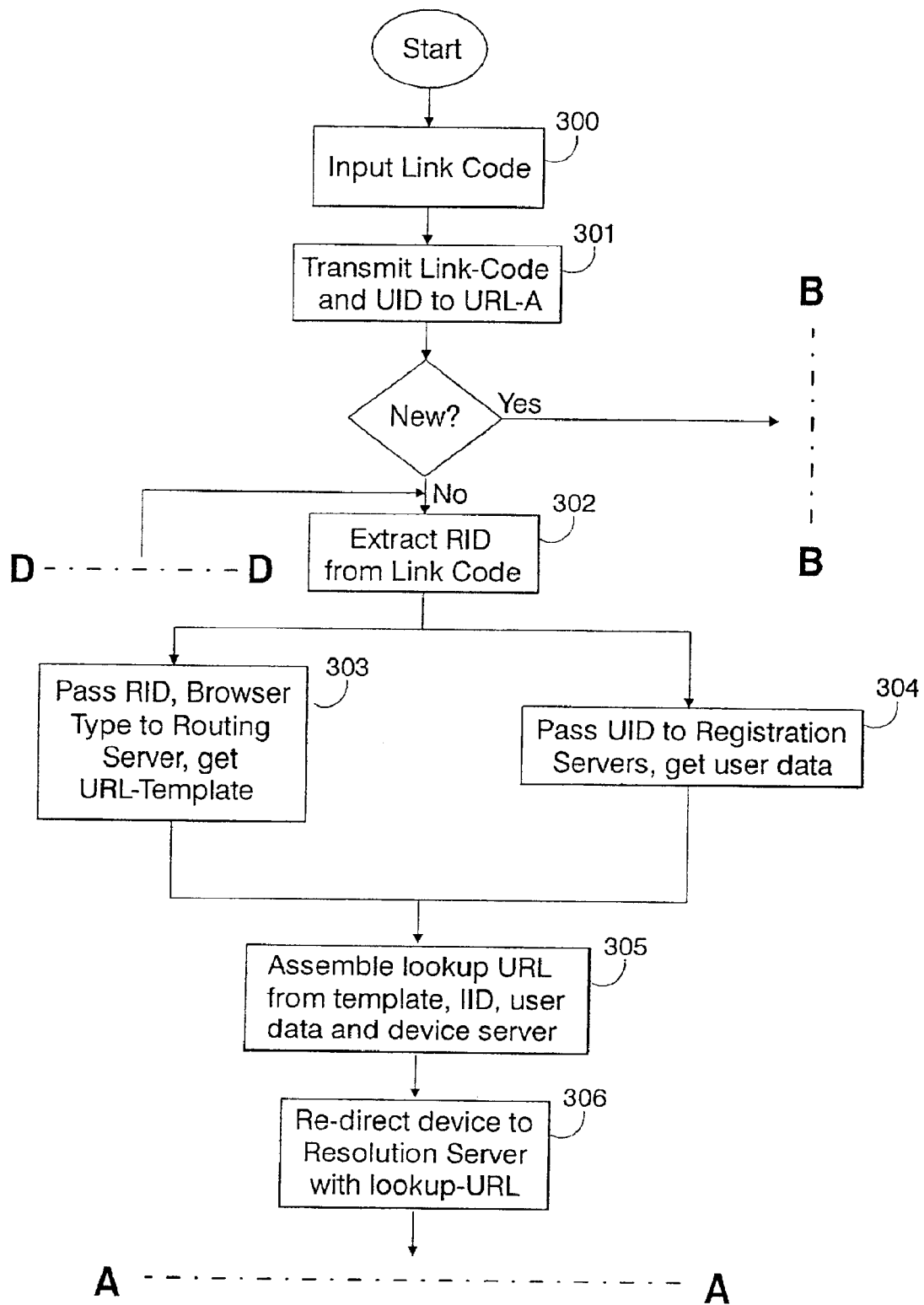
FIG. 3A depicts a flow chart of how a linkage code is mapped to a content server.
Figure 3B:
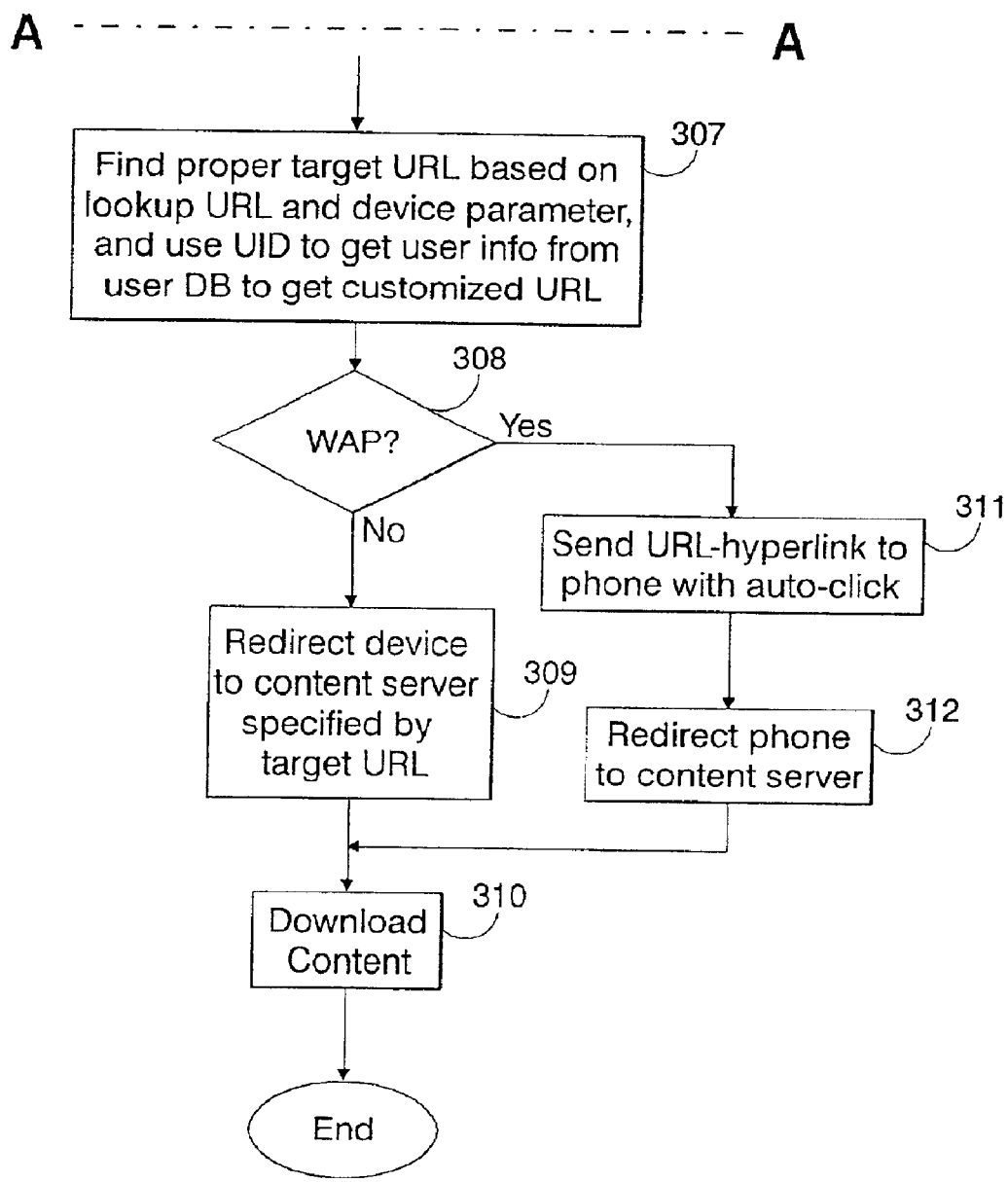
FIG. 3B is a continuation of the flowchart of FIG. 3A.

The process by which linkage codes are mapped to content that is then downloaded is depicted in FIGS. 3A and 3B. A user begins the process by entering a linkage code in field 211 at step 300 in FIG. 3A. The linkage code is transmitted to the URL-assembly server 202 at step 301. If a user is using the linkage code system for the first time, she would have to key in to the device 200 the name of the go-window in the traditional manner, by keying in the full name of the window, for example, www.paperclick.com. Once downloaded, however, the go-window can be bookmarked for easy subsequent retrieval.

Figure 3C:
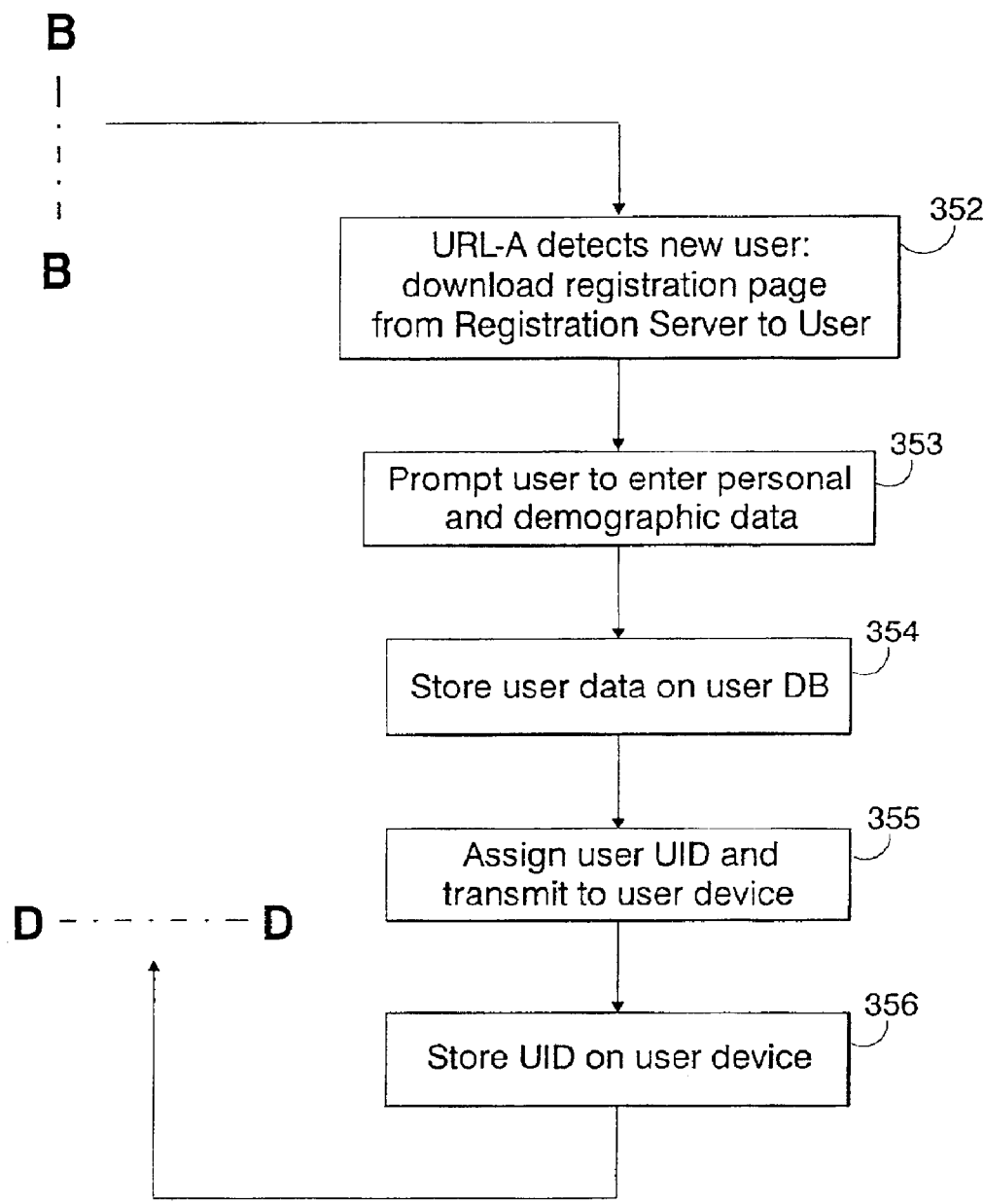
FIG. 3C depicts a flow chart of how a new user is registered by the system of the invention.

The process by which a first-time user registers with the system is depicted in FIG. 3C. If the user is using a device that can transmit a unique device identifier, such as a PDA or cell phone using the UP.LINK proxy by OPENWAVE, she will be prompted at step 352 to register with the linkage code service. The user will be connected by the URL-assembly server 202 to the registration server 203. The registration server 203 can prompt the user at step 353 to enter various items of personal information, such as her name, address, age, gender, preferred language, and preferred interests. This information is stored at step 354 in user database 214. At steps 355 and 356 the user is assigned a UID so that she can be identified by the system. As part of this process, an entry can be made in the user database linking the UID to the unique device identifier. A given UID can even be linked multiple device identifiers.

Even if a client device does not support the transmission of a unique device identifier, it can still be identified to the system if the device's mini-browser supports standard authentication means, such as the storage of cookies. For this type of client, the registration server sends a cookie to the client's browser, which stores the cookie on the client device. Subsequent transmissions for the client to then URL-assembly server would then include the cookie.

The user data enables the linkage code system of the present invention to support the profiled routing feature of the client-based linkage system of the copending application. If, however, the device 200 does not support the transmission of a UID, the user of device 200 will remain anonymous to the linkage code system, and profiled routing is not available.

Continuing with FIG. 3A, once a linkage code has been received by the URL-assembly server 202, it is broken up at step 302 into its constituent parts, namely, the RID and the IID. The RID is passed to the routing server 204 at step 303 to obtain a URL template containing the address of the resolution server 205 associated with the IID. The resolution server 205 can actually be a front for any manufacturer's or vendor's server that can map a product code to a URL. This introduces the possibility that a given manufacturer or vendor could have a server for fielding WML queries that is different from servers fielding HTML queries. Since queries coming from the proxy server 201 typically indicate in the HTML header that the device 200 supports a WML browser, the URL-assembly server 202 can optionally include a URL template selection parameter in the data stream sent to the routing server so that a WML oriented template is returned by the routing server 204 to the URL-assembly server 202. The template selection parameter can also be used to ensure that the WML content ultimately returned to the user is not encapsulated in a frameset, as framesets are not supported by WML.

If the device 200 has been previously registered with the system, its UID will be included in the transmission to the URL-assembly server 202. In this situation, the URL-assembly server at step 304 passes the UID to the registration server which in turn uses the UID to retrieve user data for that user from the user database 214, and returns that data to the URL-assembly server 202.

The URL-assembly server 202 completes the URL-template at step 305. The URL template returned by the routing server 204 has at least one field for the URL-assembly server 202 to fill in. A typical URL template will look something like: http://resolve.paperclick.com:8080/all/cmd?CMD=GET&TYPE=^TYPE^&RID=^RID^&IID=^&CODE=^CODE^, wherein the fields delimited by carets ("^") are to be filled in by the URL-assembly server. In the example shown, the fields to be filled in are the code type, the RID, the IID, and the full linkage code. If the linkage code is a UPC code equal to 051111128817, the RID would be 051111, the IID would be 12881, and the completed URL would be http://resolve.paperclick.com:8080/all/cmd?CMD=GET&TYPE=UPC&RI D=051111&IID=12881&CODE=051111128817. There can also be fields for the UID, user data retrieved from the user database maintained by the registration server, and the template selection parameter. This list of fill-in codes is illustrative, and more fill-in fields can be supported and be within the scope of the invention.

The URL template also includes a field for a parameter indicative of the display device, i.e. what markup language the display device supports. This parameter could be the template selection parameter, or it could be a separate parameter. This enables the resolution server to list the addresses of multiple versions of a given page, a feature referred to a device-based routing. Thus, publishers can host web content on multiple formats accessible with different URLs, but use the same linkage code to access the content. Users are dynamically routed to the proper content based on the characteristics of the retrieving device.

The completed URL, referred to as a lookup-URL, is a reference to both a particular resolution server and an entry in that resolution server. The resolution server can be a front for any server, such as a vendor's server, that can map the IID to appropriate content on the Internet. The lookup-URL is returned at step 306 to the device 200, or the proxy server 201 if device 200 is a WAP device, and redirects the device 200, or the proxy server 201, to the resolution server. Continuing onto FIG. 3B, the resolution server 205, at step 307, finds an appropriate target URL based on the information contained in the lookup-URL: the RID, the IID, and the user data if the user is registered. This ensures that the content customized to the user is subsequently returned. The resolution server includes lookup-tables and rules that ensure that a target URL to a content server 206 containing a web page in the correct display language is returned to the sender. The use of rules and tables to map the lookup-URL to a target-URL for content appropriate for a particular user is described in the copending application, and need not be repeated herein. The skilled artisan can easily extend the rules disclosed therein to support the device based routing feature of the present invention.

The target-URL returned by the resolution server normally redirects the sending device, either device 200 or proxy server 201, to the content server 206. In the case of a WAP compliant cell phone, however, having the proxy server perform the redirection means that the cell phone's mini-browser will not know of the redirection. Thus, when the cell phone device 200 receives the content, it would think the content had come from the server specified by the lookup URL, i.e. the resolution server 205, not the content server 206 specified by the target URL. If the returned content includes a relative URL or image reference, the device 200 will issue a request to the resolution server 205, not the content server 206. Therefore, the redirection to the content server 206 is not performed by the proxy server 201. (WAP decision box 308 branches the flow logic to either step 311 or step 309 as follows). Instead, at step 311, a data stream is returned to the WAP device 200 that includes the target-URL hyperlink along with an auto-click code to force the device 200 at step 312 to automatically make the request to the content server 206. If the device is directly connected to the Internet, that device is redirected at step 309 to the content server 206. Finally, the content is downloaded to the device 200 at step 310.

In addition to the functionality described above, the system of the present invention supports the demographic reporting, obfuscation/de-obfuscation of the UID, and profiled routing features disclosed in the copending application. In addition, the device based routing feature of the present invention can also be included with the invention of the copending application. The linkage client software disclosed in the copending application can easily be modified to include a device indicator field in the data stream transmitted to the routing server. This enables the routing server to select a URL template appropriate for the display device.

One application of profiled routing is the ability to streamline registration for cell-based services. Where there are user-specific parameters such as presentation language, a user registering for a service via a linkage code could have profile information passed from the user database 214 into the service registration process. This would potentially allow the registration form to be pre-populated with the user's information, thus allowing the user to simply confirm the information, rather than having to laboriously enter it.

Figure 4:
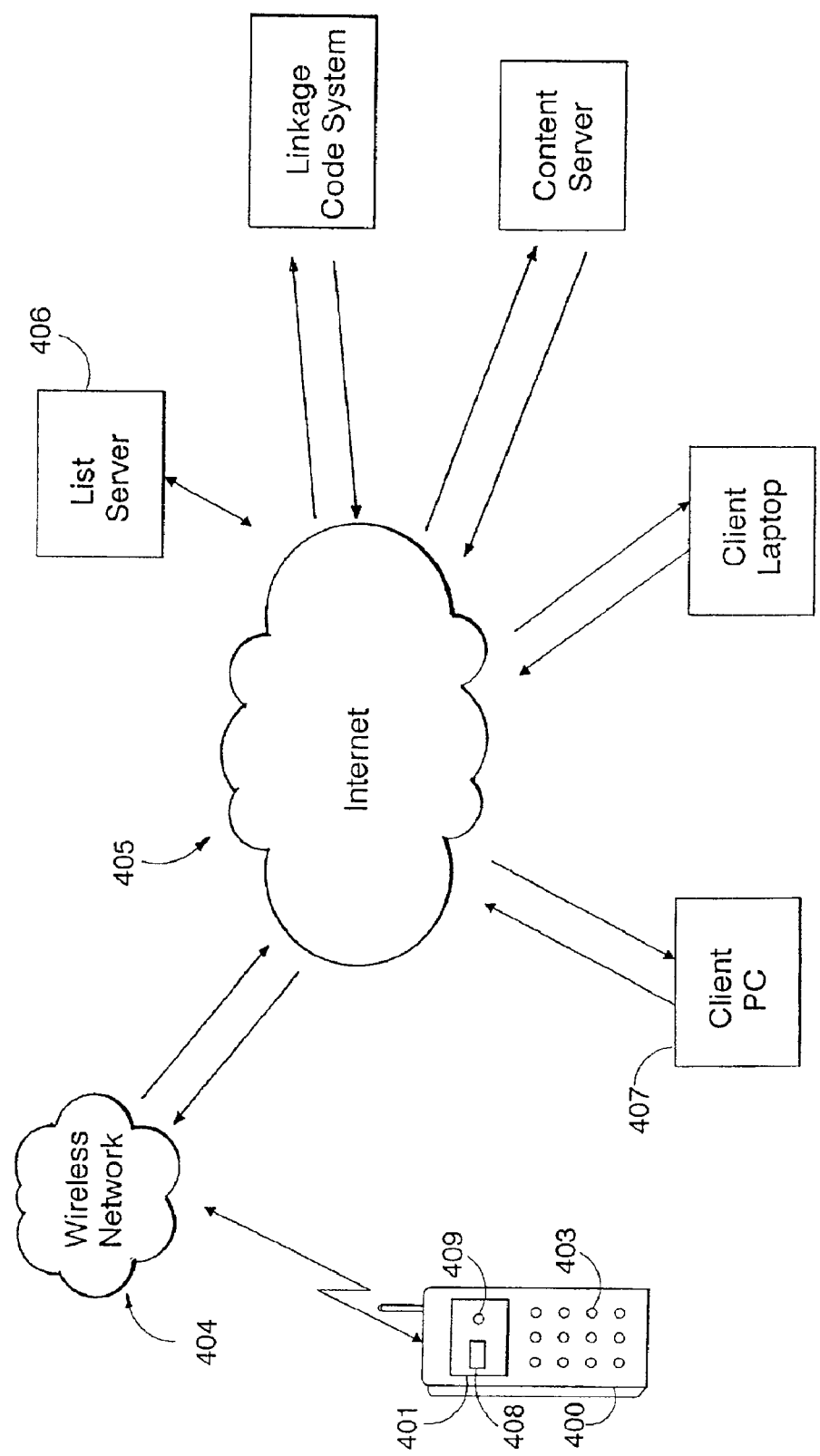
FIG. 4 depicts an exemplary system of the present invention for the storage of linkage codes on list servers.

In many cases, a cell phone user, because of the sparse nature of the WML or HDML display as compared with an HTML form, or because the user is preoccupied with another task, may not want to actually download content directly to her cell phone upon entering a linkage code, but may wish to save the linkage code for subsequent retrieval by a personal computer that supports HTML. In another aspect of the invention, a registered user can store linkage codes on a list server for subsequent retrieval. Referring now to FIG. 4, by using a simple WML or HDML form 401 on the cell phone 400, a linkage code is entered into field 408 in the form 401 via the keypad 403, and then submitted via a store button 409 over the wireless network 404 and Internet 405 to a list server 406, where it would be stored. The wireless transactions pass on the user's UID, so the system can use this to indicate which list the code should be added to. Later, when the user sits down at his or her PC 407, he or she can log into the server 406, and download the accumulated stored codes to the PC 407, just as if they had used the linkage client software. A user does not even need a PC—he or she could retrieve the codes via a WebTV, video game console (the newest generation of video game consoles apparently have browsers and modems built in) or any other device that has an embedded browser. The user's login/password can be used as the authentication means, and can be tied to their UID via the registration process.

By using the stored linkage code list service described herein, a user can download stored linkage codes lists to a client device anywhere in the world. The user can even upload linkage codes from a desktop client to the list server, then download them onto any other client device, such as a laptop computer via the web.

The system of the present invention is currently implemented on a Windows NT platform, although the system can be adapted to operate on other operating systems, such as Unix or Linux, or the Macintosh. The registration, routing and resolution servers are currently implemented as stand-alone programs, written in C++, that run as services under Windows NT, and the URL-assembly server is currently implemented as a component of the routing server. Other implementation are, of course possible, and the servers could be implemented as ISAPI DLLs running on a web server that communicate with a Microsoft SQL database server via ODBC, as CGI programs or as Java servlets. The routing server can also be implemented as a stand-alone program. Although these components have been described as if they are physically distinct machines, the skilled artisan will understand that they can be distinct processes running on the same machine.

The system of the invention is not limited to the embodiment disclosed herein. It will be immediately apparent to those skilled in the art that variations and modifications to the disclosed embodiment are possible without departing from the spirit and scope of the present invention. The invention is defined by the appended claims.

What is claimed is:

1. A method of accessing a primary content file with a client device comprising the steps of:

(a) inputting into the client device a linkage code comprising a routing identification code and an item identification code;
   (b) transmitting from the client device to a URL-assembly server a data stream comprising the linkage code;
   (c) extracting by the URL-assembly server the routing identification code from the data stream;
   (d) obtaining by the URL-assembly server a URL template associated with the routing identification code, the URL template comprising the name of a resolution server and at least one parameter field to be completed by the URL-assembly server;
   (e) completing at the URL-assembly server the URL template by filling in the at least one parameter field;
   (f) sending the completed URL template to the resolution server named therein as a primary content URL request;
   (g) determining at the resolution server the location of the primary content file based on the item identification code; and
   (h) the resolution server providing the client device with the primary content file.

2. The method of claim 1, wherein the URL template is obtained from a routing server.

3. The method of claim 2, further comprising the step of caching the URL template on the URL-assembly server, along with an expiration date for the URL template.

4. The method of claim 3, wherein the expiration date for the URL template is obtained from the routing server.

5. The method of claim 3, further comprising the step of retrieving the URL template from the routing server when the current date is later than the expiration date.

6. The method of claim 1, wherein the data stream transmitted from the client device to the URL-assembly server further comprises a URL template selection code.

7. The method of claim 6, further comprising the step of the URL-assembly server extracting the URL template selection code from the data stream.

8. The method of claim 7, wherein the URL template obtained by the URL-assembly server is also associated with the URL template selection code.

9. The method of claim 1, wherein the at least one parameter field is filled in with the item identification code by the URL-assembly server.

10. The method of claim 1, wherein the URL template is further completed by filling in the at least one parameter field with a device identification code.

11. The method of claim 10, wherein the device identification code is included in the data stream transmitted from the client device to the URL-assembly server.

12. The method of claim 1, wherein the URL template is further completed by filling in at least one parameter field with user data.

13. The method of claim 12, wherein the user data is retrieved from a user database located on a registration server.

14. The method of claim 13, wherein the user database is populated by a user during a first registration process.

15. The method of claim 13, further comprising a second registration process wherein the user uses the linkage code to register for a service, and the second registration process uses user data retrieved from said user database.

16. The method of claim 1, wherein the resolution server provides the client device with the primary content file by transmitting to the client device a primary URL for the primary content file, the primary URL comprising an auto-request code that automatically redirects the client device to a content server containing the primary content file.

17. The method of claim 16, wherein the primary URL is sent to the client device via a browser.

18. The method of claim 16, wherein the primary URL is sent to the client device via a proxy server.

19. The method of claim 1, wherein the linkage code is a bar code symbol, and wherein the step of inputting comprises the step of scanning the bar code symbol with a bar code scanning device connected to the client device.

20. The method of claim 1, wherein the linkage code is a human-readable alphanumeric text string, and wherein the step of inputting comprises the step of typing in the alphanumeric text string with a keypad connected to the client device.

21. The method of claim 1, wherein the client device is a wireless device.

22. The method of claim 21, further comprising a proxy server, by means of which the wireless device communicates with the URL-assembly server, the resolution server and the content server.

23. A computer system for accessing a primary content file on a primary content server over a computer network with a client device, comprising:
   (a) a client device interconnected to the computer network;
   (b) a URL-assembly server interconnected to the computer, network;
   (c) a resolution server interconnected to the computer network; wherein the client device comprises:
      means for inputting a linkage code comprising a routing identification code and an item identification code;
      means for transmitting a data stream comprising the linkage code to the URL-assembly server;
   the URL-assembly server comprises:
      means for extracting the routing identification code from the data stream received from the client device;
      means for obtaining a URL template associated with the routing identification code, the URL template comprising the name of a resolution server and at least one parameter field to be completed by the URL-assembly server;
      means for completing the URL template by filling in the at least one parameter field;
      means for sending the completed URL template to the resolution server named therein as a primary content URL request; and
   the resolution server comprises:
      means for determining the location of the primary content file based on the item identification code; and
      means for providing the client device with the primary content file.

24. The computer system of claim 23, further comprising a routing server from which the URL-assembly server obtains the URL template.

25. The computer system of claim 24, wherein the URL-assembly server caches the URL template, along with an expiration date for the URL template.

26. The computer system of claim 25, wherein the expiration date for the URL template is obtained from the routing server.

27. The computer system of claim 25, wherein the URL-assembly server further comprises means for retrieving the URL template from the routing server when the current date is later than the expiration date.

28. The computer system of claim 23, wherein the data stream transmitted from the client device to the URL-assembly server further comprises a URL template selection code.

29. The computer system of claim 28, wherein the URL-assembly server further comprises means for extracting the URL template selection code from the data stream.

30. The computer system of claim 29, wherein the URL template obtained by the URL-assembly server is also associated with the URL template selection code.

31. The computer system of claim 23, wherein the URL-assembly server further comprises means for completing the URL template by filling in at least one parameter field with the item identification code.

32. The computer system of claim 23, wherein the URL-assembly server further comprises means for completing the URL template by filling in at least one parameter field with a device identification code.

33. The computer system of claim 32, wherein the client device further comprises means for including the device identification code in the data stream transmitted from the client device to the URL-assembly server.

34. The computer system of claim 23, wherein the URL-assembly server further comprises means for further completing the URL template by filling in at least one parameter field with user data.

35. The computer system of claim 34, further comprising a registration server comprising a user database, wherein the user data is retrieved from the user database.

36. The computer system of claim 35, wherein the user database is populated by a user during a first registration process.

37. The computer system of claim 35, further comprising a second registration process wherein the user uses the linkage code to register for a service, and the second registration process uses user data retrieved from said user database.

38. The computer system of claim 23, wherein the resolution server comprises means for providing the client device with the primary content file by transmitting to the client device a primary URL for the primary content file, the primary URL comprising an auto-request code that automatically redirects the client device to a content server containing the primary content file.

39. The computer system of claim 38, wherein the primary URL is sent to the client device via a browser.

40. The computer system of claim 38, wherein the primary URL is sent to the client device via a proxy server.

41. The computer system of claim 23, wherein the means for inputting a linkage code comprises a bar code scanning device for scanning a linkage code in the form of a bar code symbol.

42. The computer system of claim 23, wherein the means for inputting a linkage code comprises a keypad for entering a linkage code in the form of a human-readable alphanumeric text string.

43. The computer system of claim 23, wherein the client device is a wireless device.

44. The computer system of claim 43, further comprising a proxy server, by means of which the wireless device communicates with the URL-assembly server, the resolution server and the content server.

* * * * *